United States Patent
Moorthy et al.

(10) Patent No.: US 12,545,075 B2
(45) Date of Patent: Feb. 10, 2026

(54) DEVICE FOR REGULATING A THROUGH-FLOW AND EXPANDING OF A FLUID IN A FLUID CIRCUIT

(71) Applicant: Hanon Systems, Daejeon (KR)

(72) Inventors: Arjun Krishna Moorthy, Cologne (DE); Carsten Ohrem, Bergheim (DE); Daniel Zens, Kreuzau (DE); Nils Michael Schlattmann, Öln (DE); Andreas Capelle, Pulheim (DE)

(73) Assignee: Hanon Systems, Daejeon (KR)

( * ) Notice: Subject to any disclaimer, the term of this patent is extended or adjusted under 35 U.S.C. 154(b) by 190 days.

(21) Appl. No.: 18/547,574

(22) PCT Filed: Mar. 30, 2022

(86) PCT No.: PCT/KR2022/004513
§ 371 (c)(1),
(2) Date: Aug. 23, 2023

(87) PCT Pub. No.: WO2022/211494
PCT Pub. Date: Oct. 6, 2022

(65) Prior Publication Data
US 2024/0066945 A1    Feb. 29, 2024

(51) Int. Cl.
| | |
|---|---|
| B60H 1/00 | (2006.01) |
| F16K 1/36 | (2006.01) |
| F16K 1/42 | (2006.01) |
| F16K 31/50 | (2006.01) |
| F25B 41/35 | (2021.01) |
| F25B 41/38 | (2021.01) |

(52) U.S. Cl.
CPC ..... B60H 1/00485 (2013.01); B60H 1/00885 (2013.01); F16K 1/36 (2013.01); F16K 1/42 (2013.01); F16K 31/508 (2013.01); F25B 41/35 (2021.01); F25B 41/38 (2021.01); F25B 2341/06 (2013.01)

(58) Field of Classification Search
CPC ... B60H 1/00485; B60H 1/00885; F16K 1/34; F16K 1/36; F16K 1/42; F16K 31/508; F25B 41/30; F25B 41/31; F25B 41/35; F25B 41/38; F25B 2341/06
See application file for complete search history.

(56) References Cited

U.S. PATENT DOCUMENTS

| | | |
|---|---|---|
| 2006/0102866 A1 | 5/2006 | Yamagishi |
| 2016/0290515 A1 | 10/2016 | Nakata et al. |
| 2018/0135903 A1 | 5/2018 | Wiechard et al. |

FOREIGN PATENT DOCUMENTS

| | | | |
|---|---|---|---|
| DE | 102016013492 A1 | | 5/2018 |
| JP | 2007327613 A | * | 12/2007 |
| JP | 2007327614 A | | 12/2007 |
| KR | 20170054543 A | | 5/2017 |

OTHER PUBLICATIONS

JP 2007-327614 (English translation) (Year: 2007).*

* cited by examiner

*Primary Examiner* — Jonathan Bradford
(74) *Attorney, Agent, or Firm* — James D. Miller; Shumaker, Loop & Kendrick, LLP

(57) ABSTRACT

A device for regulating a through-flow and expanding a fluid in a fluid circuit, in particular a refrigerant in a refrigerant circuit of an air-conditioning system of a motor vehicle. The device has a housing and a valve element arranged in the interior of the housing as well as at least one sealing element.

31 Claims, 6 Drawing Sheets

DEVICE FOR REGULATING A THROUGH-FLOW AND EXPANDING OF A FLUID IN A FLUID CIRCUIT

CROSS-REFERENCE TO RELATED PATENT APPLICATIONS

This patent application is a United States national phase patent application based on PCT/KR2022/004513 filed on Mar. 30, 2022, which claims the benefit of German Patent Application No. 10 2022 106 976.1 filed on Mar. 24, 2022 and German Patent Application No. 10 2021 108 474.1 filed on Apr. 2, 2021, the entire disclosures of each of which are hereby incorporated herein by reference.

TECHNICAL FIELD

The invention relates to a device for regulating a through-flow and expanding a fluid in a fluid circuit, in particular a refrigerant in a refrigerant circuit of an air-conditioning system of a motor vehicle. The device has a housing and a valve element arranged in the interior of the housing as well as at least one sealing element. The valve element and the sealing element are oriented coaxially to a longitudinal axis. The valve element which is movably arranged in the direction of the longitudinal axis relative to the housing abuts the sealing element in a closed condition of the device. In an opened condition of the device, at least one fully circumferential gap between the valve element and the sealing element is formed.

BACKGROUND ART

A valve as a device for regulating a through-flow and expanding a refrigerant, in particular an expansion valve, fulfills the functions of sealing in the closed condition, of regulating a mass flow or of expanding the refrigerant according to a characteristic curve and a passing at full load at a flow cross-section opened at maximum. The operation with flow cross-section of the valve opened at maximum allows a through-flow of the refrigerant under minimum or without significant pressure loss.

Apart from the stated functions, the valve should fulfill further criteria. In doing so, the transition between the functions of sealing and regulating or expanding should be as continuous as possible and thus without a leap within the corresponding characteristic line. The sealing is also to be guaranteed in a condition without current of a valve driven by an electric motor, consequently the valve should be formed in a self-sealing or self-inhibiting manner. The valve is to be configured for a pressure drop abutting on both sides. In doing so, the pressure difference can be up to 100 bar. The valve should be usable in a temperature range from −40° C. to +180° C.

A further requirement for the valve lies in the avoidance of the emission of noise during operation, specifically during through-flow of the valve, in the form of flow noise and whistling noise. A special challenge are valves which are flowed through bidirectionally, which, depending on the operation type of the system are charged in a first direction or a second direction opposite to the first direction. For example, refrigerant valves employed in refrigerant circuits of air-conditioning systems of motor vehicles are flowed through in the first direction during operation of the system in a refrigerating system mode, while the refrigerant valve is flowed through in the second direction during operation of the system in a heat pump mode.

In DE 10 2016 013 492 A1, an electrically driven expansion valve and shut-off valve for the operation with the refrigerant R744 is disclosed. The valve has a valve body arranged in a valve body chamber and a sealing seat and a seal which is oriented along an axial movement direction of the valve body within the valve. The valve is formed such that, in a closed condition, there is a pressure bypass to the valve body chamber. In doing so, the valve body is provided with a through opening substantially extending in the axial direction as a part of the pressure bypass. The pressure bypass extends from a connection through the valve body to the valve body chamber.

From the prior art, it is known to respond to flow noise and whistling noise occurring when the valve is flowed through by means of a special geometry in the sealing region of the valve. However, with the known geometries, the noise emission, in particular at the valve seat or at the throttle point, can only be decreased when the valve is flowed through in a first flow direction, while the noise is still emitted when the valve is flowed through in the second flow direction deviating from the first flow direction. Furthermore, the enormous number of possible operating points with different parameters and opening positions of the valve constitutes a huge effort in order to avoid the noise emitted in the whole characteristic operation field during operation.

SUMMARY

The object of the invention is the provision and improvement of a device for regulating a through-flow and expanding a fluid in a fluid circuit, in particular in a refrigerant circuit, specifically an air-conditioning system of a motor vehicle, which fulfills the requirements stated above. In doing so, the device shall minimize in particular the emission of noise independent of the through-flow direction of the device. Furthermore, the production shall be simple and thus the production costs of the device minimal.

The object is achieved by the subject matters with the features as shown and described herein.

The object is achieved by a device for regulating a through-flow and expanding a fluid in a fluid circuit, in particular a refrigerant in a refrigerant circuit. The device has a housing and a valve element arranged in the interior of the housing as well as at least one sealing element. The valve element and the sealing element are oriented coaxially to a longitudinal axis.

The valve element which is movably arranged in the direction of the longitudinal axis relative to the housing abuts the sealing element in a closed condition of the device. In an opened condition of the device, at least one fully circumferential gap between the valve element and the sealing element is formed.

According to the concept of the invention, the at least one sealing element forms a sealing seat in connection with the valve element. In doing so, the sealing element or the valve element has at least two sealing faces in the region of the sealing seat which are arranged spaced apart from one another in the direction of the longitudinal axis. A respective groove is formed between sealing faces which are arranged adjacent to one another.

According to a further development of the invention, the valve element is formed as a valve needle in a rotation-symmetric manner about the longitudinal axis, in particular with a substantially cylindrical shape, specifically a circular cylindrical shape.

According to a preferred embodiment of the invention, the at least one sealing element has the shape of a circular ring with a circular opening for receiving the valve element. In doing so, the sealing faces and the groove which is formed between respective sealing faces which are arranged adjacent to one another are preferably formed in a fully circumferential manner on an inner casing face of the at least one sealing element.

The at least one sealing element has, on the inner casing face, preferably an annular protrusion which protrudes from the inner casing face. The annular protrusion protruding from the inner casing face is preferably formed with an end face with a sealing seat diameter D1 facing the interior in the radial direction. The end face is to be understood as a free surface or as a free side. The sealing seat diameter D1 has a value in the range from 1 mm to 12 mm, specifically in the range from 5 mm to 9 mm, in particular of 7 mm.

The at least two sealing faces and the groove which is formed between respective sealing faces which are arranged adjacent to one another are preferably provided on the end face directed to the interior in the radial direction of the annular protrusion protruding from the inner casing face of the at least one sealing element.

According to an advantageous embodiment of the invention, the inner casing face of the at least one sealing element has a first sealing element diameter D2 in a first region bordering the protrusion protruding from the inner casing face in the direction of the longitudinal axis on the one hand and a second sealing element diameter D3 in a second region bordering the protrusion protruding from the inner casing face in the direction of the longitudinal axis on the other hand. In doing so, the first sealing element diameter D2 can be in a range from 1.05500 D1 to 1.50•D1, while the second sealing element diameter D3 can be in the range from 1.20•D1 to 4.00•D1.

Legs connecting the end face of the protrusion protruding from the inner casing face of the at least one sealing element to the inner casing face are preferably respectively oriented in an opening angle a1, a2 to the longitudinal axis. In doing so, a first opening angle a1 as an angle of a first leg to the longitudinal axis can have a value in the range from 0 to 100°, while a second opening angle a2 as an angle of a second leg to the longitudinal axis can have a value in the range from 30° to 90°.

A further advantage of the invention is that the at least two sealing faces, in particular in the direction of the longitudinal axis, are oriented parallel and flush to one another.

According to a further preferred embodiment of the invention, the at least two sealing faces are formed with different extensions L-1, L-2 in the direction of the longitudinal axis and the groove which is formed between respective sealing faces which are arranged adjacent to one another is formed with an extension LN in the direction of the longitudinal axis and a depth DN in the radial direction. In doing so, a first sealing face can have an extension L-1 in the direction of the longitudinal axis in the range from 0.2 mm to 3.0 mm, while a second sealing face can have an extension L-2 in the direction of the longitudinal axis in the range from 0.1 mm to 10.0 mm.

The groove which is provided between respective sealing faces which are arranged adjacent to one another can be formed with an extension LN in the direction of the longitudinal axis in the range from 0.1 mm to 10.0 mm and a depth DN in the radial direction in the range from 0.1 mm to 4.0 mm.

According to a further development of the invention, in the opened condition of the device, at least one fully circumferential first ring-shaped gap with an extension L-1 of a first sealing face in the direction of the longitudinal axis and a fully circumferential second ring-shaped gap with an extension L-2 of a second sealing face in the direction of the longitudinal axis are formed between the valve element and the at least one sealing element in the region of the sealing seat. In doing so, the at least two gaps formed in the region of the sealing seat preferably have different extensions L-1, L-2 in the direction of the longitudinal axis.

According to a further advantageous embodiment of the invention, the valve element is arranged for guiding and holding within a valve seat element or within a valve seat sealing element which respectively allows a linear movement of the valve element in the direction of the longitudinal axis.

According to a first alternative embodiment of the invention, the at least one sealing element is preferably formed as a valve seat seal, sealing the valve element against the housing and against the valve seat element.

The valve element is in particular arranged in a sealing manner against the housing and against the valve seat element via two sealing elements. In doing so, advantageously respectively a first sealing element is formed as the valve seat seal, sealing the valve element against the housing and against the valve seat element, while a second sealing element is formed as a sliding seal, sealing the valve element against the housing.

According to a second alternative embodiment of the invention, the at least one sealing element is formed as a valve seat sealing element, sealing the valve element against the housing. The valve element is in particular arranged in a sealing manner against the housing via two sealing elements. In doing so, advantageously a first sealing element is formed as the valve seat sealing element and a second sealing element is formed as a sliding seal, sealing the valve element against the housing.

A further advantage of the invention is that an actuating element and a transmission arrangement for transmitting a rotational movement of the actuating element about the longitudinal axis into a linear movement of the valve element are provided in the direction of the longitudinal axis relative to the housing. In doing so, the actuating element is preferably formed as a drive shaft. The drive shaft is preferably connected to an electric motor, in particular a stepping motor or a servo motor which can set the drive shaft into rotational movement about the longitudinal axis. The drive shaft can be fixed within the housing in the direction of the longitudinal axis and thus in the axial direction.

The housing can be formed with connections for connecting to fluid lines which are respectively connected to the interior of the housing via a through opening. In doing so, axes of symmetry of the through openings of the connections of the housing can have a common intersection in which the valve element is arranged.

A through opening of a first connection of the housing can preferably be oriented in a radial direction to the longitudinal axis, while a through opening of a second connection of the housing can be arranged on an opposite side of the actuating element to the valve element.

Furthermore the axis of symmetry of the through opening of the second connection of the housing and the longitudinal axis can be oriented coaxially to one another.

The advantageous embodiment of the invention enables the use of the device for regulating a through-flow and expanding a fluid in a refrigerant circuit of an air-conditioning system of a motor vehicle. The device according to the invention can be employed in refrigerant circuits with different refrigerants such as R1234yf, R134A, propane and R744.

The device of the invention for regulating a through-flow and expanding a fluid in a fluid circuit can consequently be formed as a refrigerant expansion valve which can be flowed through in a bidirectional manner and which can be operated noise-free. The groove additionally provided in the direction of the longitudinal axis between the sealing faces enables a pre-expansion or a post-expansion of the gas which respectively interferes with the formation of turbulences and thus avoids a harmonic noise development.

The special geometry of the sealing seat or of a sealing region or a regulation region leads to an overlap of positive effects, for example when flowing in, when flowing out, a local pressure drop and turbulences which reduces or eliminates the noise development and the noise emission at a respective flow in both flow directions.

In summary, the device according to the invention for regulating a through-flow and expanding a fluid in a fluid circuit has further various advantages:
- a formation of the sealing region, in particular of the sealing seat, in due form and due measure, of a refrigerant expansion shut-off valve which avoids any kind of noise independent of the through-flow direction,
- reliable operation in large temperature range and pressure range, and
- simple production at minimum production costs.

With the use of the device according to the invention in a refrigerant circuit of an air-conditioning system of a motor vehicle, in particular of a system operable in a heat pump mode, a large amount of energy is used as heating energy. Apart from the direct savings of energy, the reach and thus the acceptance may be increased specifically in the case of motor vehicles driven by an electric motor.

BRIEF DESCRIPTION OF DRAWINGS

Further details, features and advantages of embodiments of the invention result from the following description of example embodiments with reference to the accompanying drawings. It is shown.

DETAILED DESCRIPTION OF EMBODIMENTS

Figure 1A:
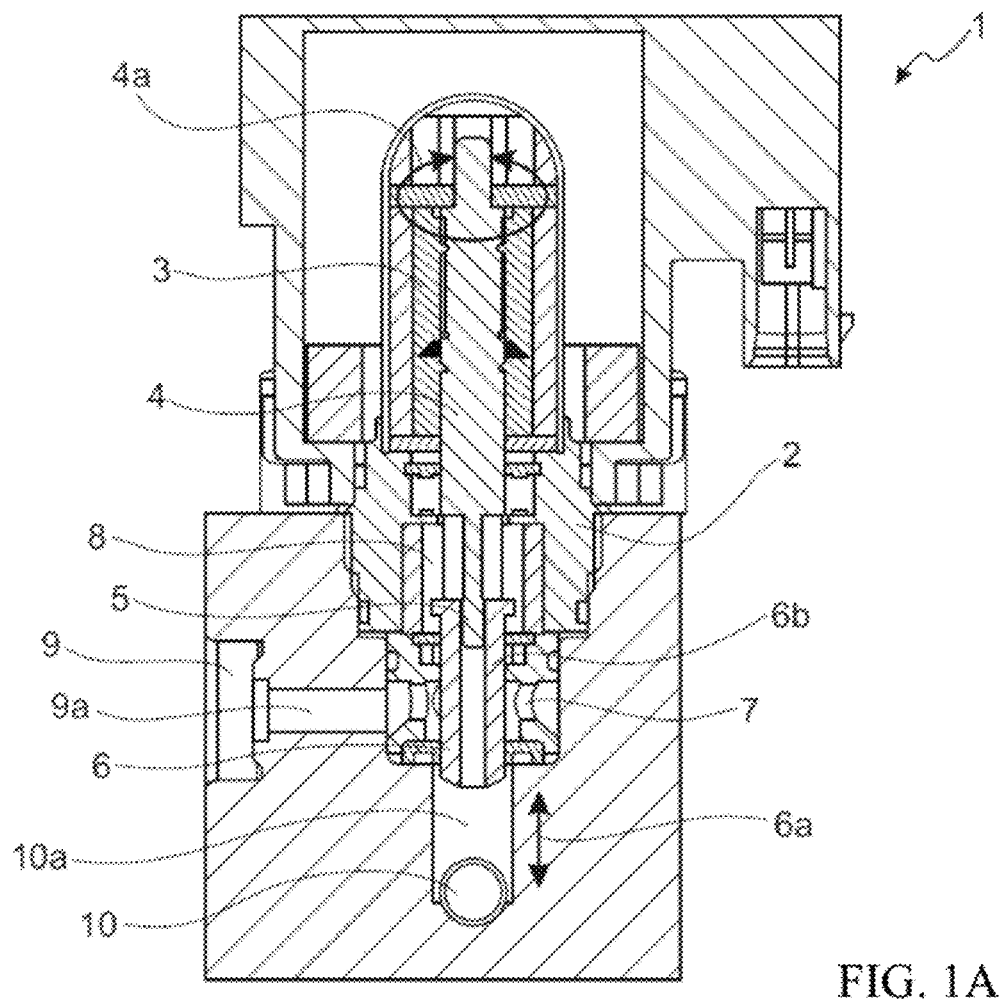
FIGS. 1A and 1B: a device for regulating a through-flow and expanding a fluid in a fluid circuit, with a housing and a valve element arranged inside the housing as well as an actuating element with a transmission arrangement in closed condition, respectively in a lateral sectional representation.
Figure 1B:
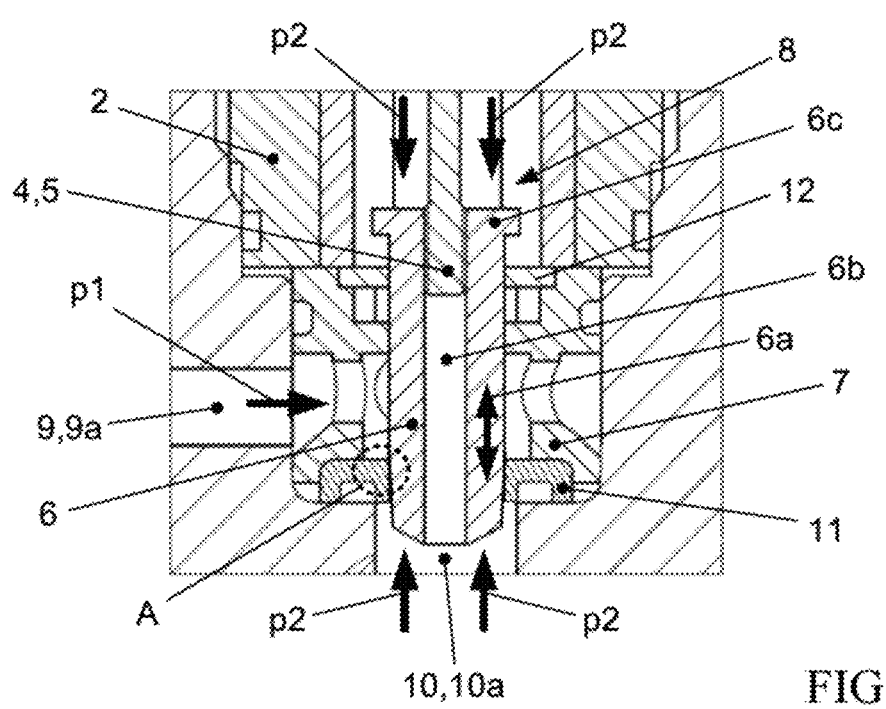

In FIGS. 1A and 1B, a respective device 1 for regulating a through-flow and expanding a fluid in a fluid circuit, in particular a valve 1, specifically in a refrigerant circuit of an air-conditioning system of a motor vehicle, with a housing 2 and a valve element 6 arranged within the housing 2 and an actuating element 4 with a transmission arrangement 5 in a closed condition of the device 1 respectively in a lateral sectional representation is shown. The device 1, in particular the valve element 6, is driven via an electric motor 3. The electric motor 3 sets a drive shaft formed as an actuating element 4 into a rotational movement 4a.

With the help of the transmission arrangement 5 provided on the drive shaft 4 oriented in an axial direction, in particular a thread, specifically of a so-called movement thread, the rotational movement 4a of the drive shaft 4 is transmitted about its longitudinal axis into a translational stroke movement of a valve element 6 preferably formed as a valve needle. The translational stroke movement thus corresponds to a linear movement 6a of the valve element 6 in the axial direction and thus in the direction of the longitudinal axis of the drive shaft 4.

The thread pairing of the transmission arrangement 5 is provided between the drive shaft 4 and the valve element 6. In doing so, a free end of the drive shaft 4, which substantially has the shape of a cylinder rod, in particular a round rod with sections of different diameters, is inserted into an opening 6b formed in the valve element 6. The free end of the drive shaft 4 is arranged distally to an end connected to the electric motor 3. The drive shaft 4 thus has, on the free end, an outer thread as a first element of the thread pairing, while an inner thread is formed as a second element of the thread pairing within the opening 6b of the valve element 6.

The valve element 6 is arranged in a valve seat element 7. In doing so, the valve element 6 which is linearly moved in the axial direction and substantially extends in the axial direction is held via an anti-sliding rotation arrangement 8 which prevents a rotational movement of the valve element 6 about the axial direction or the longitudinal axis of the valve element 6 and permits the linear movement 6a in the axial direction.

Figure 1C:
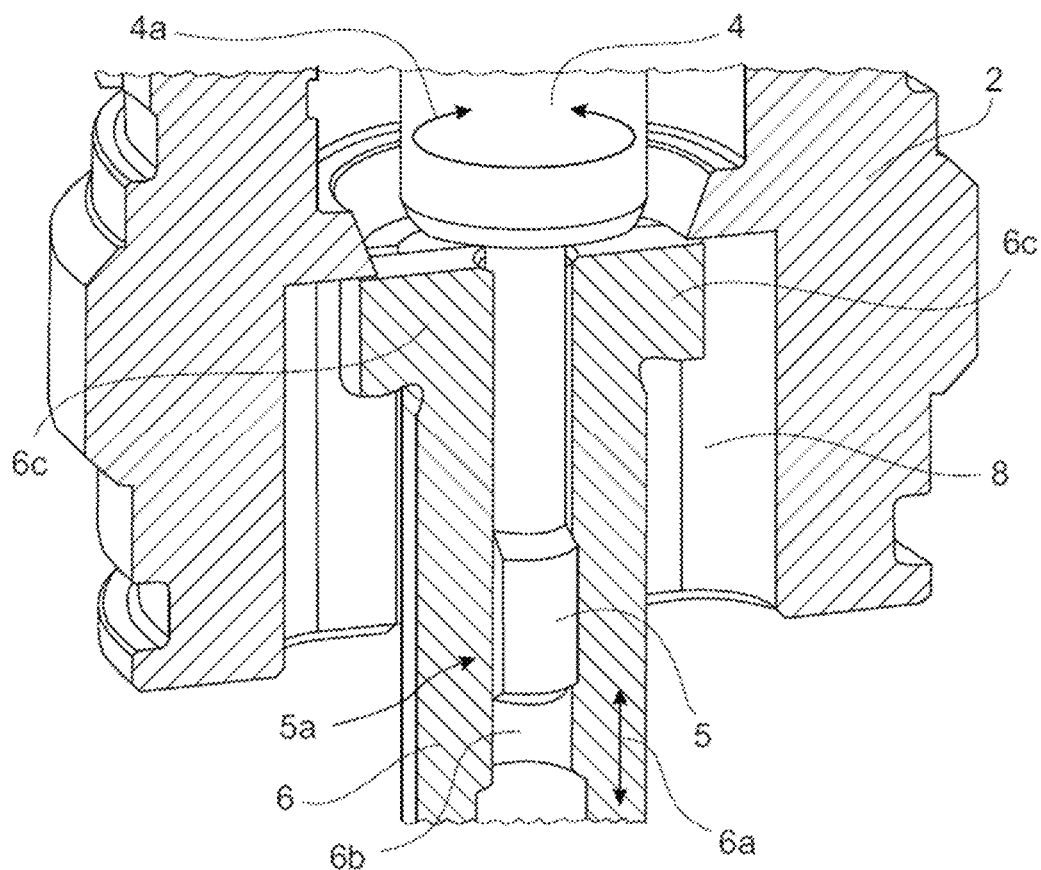
FIGS. 1C and 1D: the valve element and the actuating element with the transmission arrangement within the housing, respectively in a detailed view in a perspective sectional representation and in a plan view.
Figure 1D:
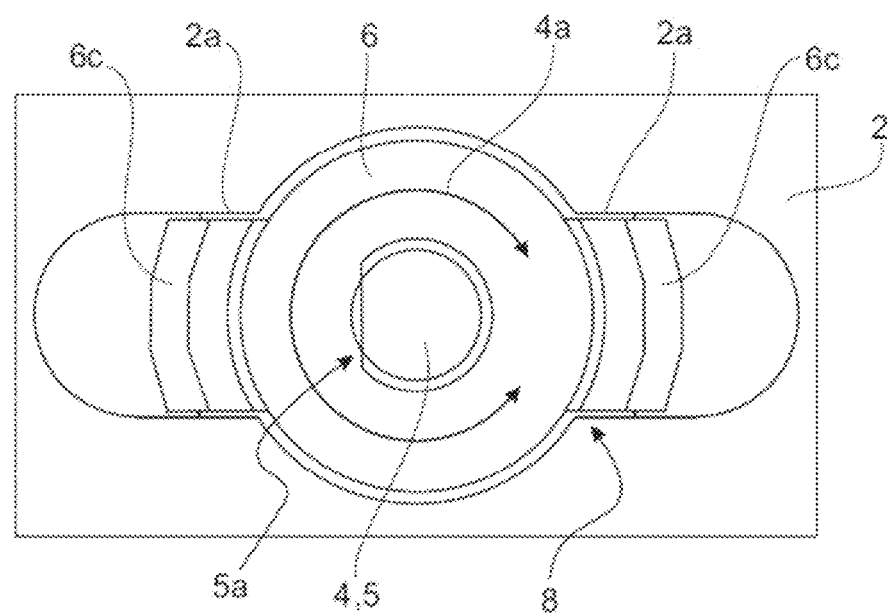

The valve element 6 has formations 6c in the region sliding along within the housing 2. The formations 6c are formed on an end of the valve element 6 oriented towards the electric motor 3 and protrude in opposite pairs from the valve element 6, which is in particular seen in FIGS. 1C and 1D. Thus, the valve element 6 has a T-shape in a cross-section through the longitudinal axis. In FIGS. 1C and 1D, the valve element 6 and the actuating element 4 are shown with the transmission arrangement 5 within the housing 2 respectively in a detailed view in a perspective sectional representation and in a plan view.

The housing 2 is, in the region of the formations 6c of the valve element 6, formed with notch-shaped or groove-like recesses 2a which are arranged opposite to one another regarding the longitudinal axis of the valve element 6 and whose shape respectively corresponds to a formation 6c of the valve element 6. In doing so, the shapes of the recesses 2a of the housing 2 respectively correspond to the outer shape of the formations 6c of the valve element 6 plus a clearance for the sliding movement of the valve element 6 within the housing 2 in the axial direction.

By arranging the formations 6c of the valve element 6 which is T-shaped in cross-section within the notch-shaped or groove-like recesses 2a of the housing 2, a rotational movement of the valve element 6, driven by the actuating element 4 rotating about the longitudinal axis, is avoided. Thus, the valve element 6 is moved through the rotational movement 4a of the actuating element 4 without its own rotation about the longitudinal axis in the linear movement 6a.

The device 1 is also formed with a first connection 9 and a second connection 10. A through opening 9a of the first connection is oriented in the radial direction to the valve element 6, while a through opening 10a of the second connection 10 is oriented in the axial direction of the valve element 6. The through opening 9a of the first connection 9 is charged with refrigerant with a first pressure p1 such that the pressure p1 acts on the valve element 6 substantially in the radial direction. The through opening 10a of the second connection 10 is charged with refrigerant with a second pressure p2 such that the pressure p2 acts on the valve element 6 substantially in the axial direction. All pressurized faces of the valve element 6 are adapted such that the valve element 6 is arranged in a nearly isostatic condition. The pressure forces acting on the valve element 6 are in balance. A section 5a which is formed as a flattened region in the region of the thread of the otherwise circular cross-section guarantees the pressure balance in the axial direction regarding the second pressure p2 within the valve 1 as a through-flow opening in combination with the opening 6b of the valve element 6 formed as a through bore.

Furthermore, the valve element 6 is arranged in a sealing manner against the housing 2 and against the valve seat element 7 via two sealing elements 11, 12, in particular a first, static sealing element 11, and a second, dynamic sealing element 12 is arranged in a sealing manner against the housing 2. The first sealing element 11 is formed as a seat seal, in particular as a valve seat seal, while the second sealing element 12 is formed as a sliding seal, in particular a rod seal, in the shape of an axial seal or a ring seal. Consequently, the first sealing element 11 is arranged between the housing 2, the valve element 6 and the valve seat element 7.

Figure 1E:
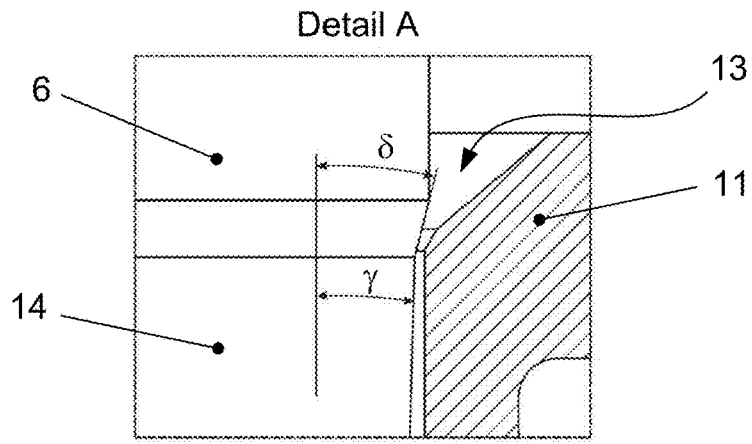
FIG. 1E: detailed view of the arrangement of the valve element within the valve seat element or a sealing element.

FIG. 1E respectively shows a detailed view of the arrangement of the valve element 6 within the valve seat element 7 or within the first sealing element 11.

In the closed condition of the device 1, the valve element 6 abuts the first sealing element 11 in a sealing region 13, while the vale element 6 in the opened condition of the device 1 is shifted in the axial direction with regard to the first sealing element 11 such that a fully circumferential gap between the valve element 6 and the first sealing element 11 is formed.

The sealing region 13 has a sealing face which runs about the circumference on the first sealing element 11 and a sealing face which runs about the circumference on the valve element 6 which are formed conically to the longitudinal axis in a like-minded manner and correlate to one another. In the closed condition of the device 1, the sealing face of the first sealing element 11, which is further connected to the housing 2 and the valve seat element 7 in a sealing manner, and the sealing face of the valve element 6 bear against one another in a fluid-tight manner. The conically formed sealing face of the valve element 6 is oriented, at an extension of the sealing region 13 in the direction of the longitudinal axis of the valve element 6 of about 0.05 mm at an angle 6 in the range from 3° to 10°, in particular in the range from 3° to 6°, to the longitudinal axis. Due to the conical design of the sealing faces, the valve element 6 can be inserted into the first sealing element 11 in a centered manner when the device 1 is being closed.

In the opened condition of the device 1, the sealing faces of the valve element 6 and of the sealing element 11 are arranged spaced apart from one another. Next to the sealing region 13, the valve element 6 has a regulation region 14, which are arranged adjacent to one another in the axial direction. A regulating face of the regulation region 14 is conically formed like the sealing face of the sealing region 13 and is oriented, at an extension of the regulation region 14 in the direction of the longitudinal axis of the valve element 6 of about 6 mm, at an angle 7 in the range from 0.5° to 2°, in particular in the range from 1° to 2°, to the longitudinal axis.

The conical designs of the sealing face of the sealing region 14 and the regulating face of the regulation region 14 are oriented in a like-minded manner. Due to the conical shape of the regulating face of the regulation region 14 in the direction of the longitudinal axis of the valve element 6, the flow cross-section for the fluid to be guided through the device 1 is continually changed with the linear movement 6a of the valve element 6 in the axial direction until the valve element 6 is fully removed from the first sealing element 11 or the device 1 is closed and the valve element 6 bears against the first sealing element 11 in a fluid-tight manner. By means of the linear movement 6a of the valve element 6 with regard to the first sealing element 11, the mass flow of the fluid through the device 1 is regulated in combination with the regulating face of the regulation region 14.

Figures 2A, 2B:
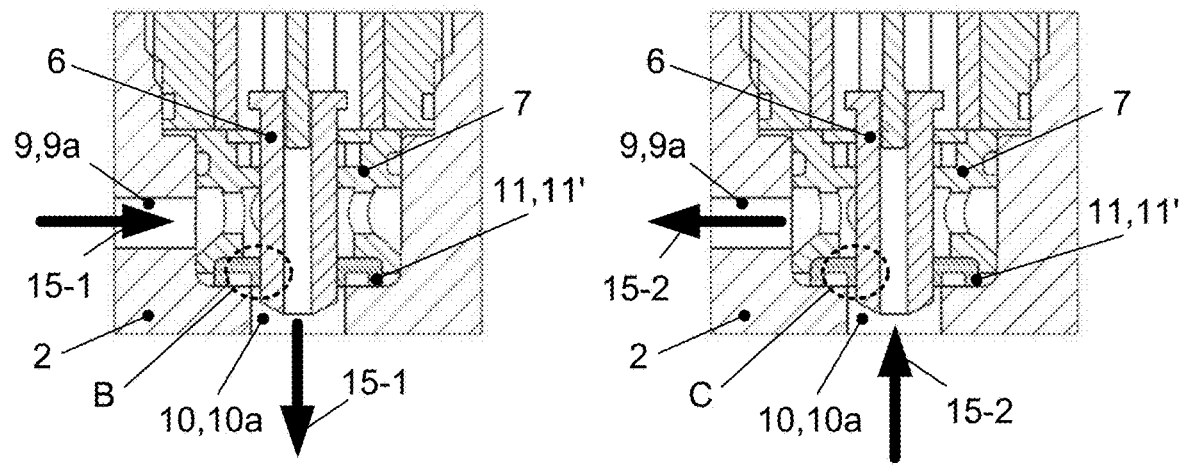
FIGS. 2A and 2B: the through-flow directions of the fluid through the device for regulating a through-flow and expanding the flow of FIGS. 1A to 1E in a respective sectional representation of the device.
Figures 2C, 2D:
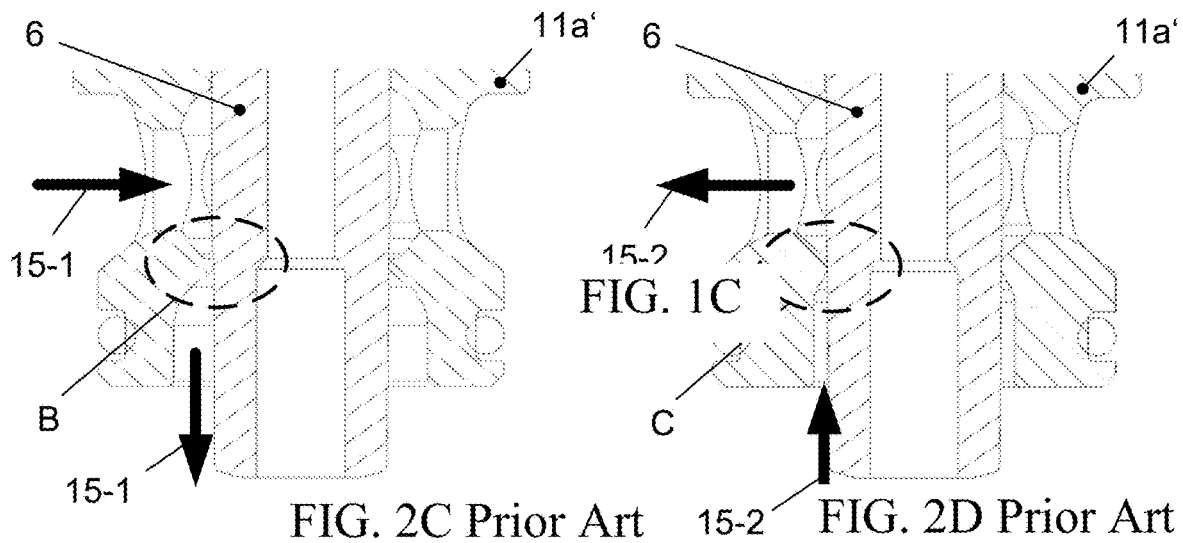
FIGS. 2C and 2D: alternative embodiments to the devices represented in FIGS. 2A and 2B of a sealing region of the prior art respectively formed between the valve element and a sealing element.

FIGS. 2A and 2B respectively show the through-flow direction of the fluid through the device 1 for regulating a through-flow and expanding the fluid by means of the flow direction 15-1, 15-2 from FIGS. 1A to 1E in a sectional representation of the device 1, while FIGS. 2C and 2D show alternative embodiments to the devices represented in FIGS. 2A and 2B of a sealing region of the prior art which is respectively formed between the valve element 6 and a sealing element 11a'. Compared to the embodiments according to FIGS. 2A and 2B, the sealing element 11a' combines the functions of the first sealing element 11, 11' and of the valve seat element 7. In doing so, the valve seat element 7 and the first sealing element 11, 11' are formed as a sealing element 11a', in particular as a so-called valve seat element, as an integral component.

The sealing regions of devices known from the prior art have, depending on the flow direction 15-1, 15-2 of the fluid through the device, differently formed sealing faces, in particular on the sealing element 11', 11a'.

According to FIGS. 2A and 2C, the fluid flows in a first flow direction 15-1 through the through opening 9a of the first connection 9, which serves as an inlet, into the device, through the valve seat element 7 and the first sealing element 11' or through the sealing element 11a' formed as a valve seat sealing element and through the through opening 10a of the second connection 10, which serves as an outlet, out of the device. In comparison thereto, the fluid flows, according to FIGS. 2B and 2D, in a flow direction 15-2 opposite to the first flow direction 15-1 through the through opening 10a of the second connection 10, which serves as an inlet, into the device, through the first sealing element 11' and the valve seat element 7 or through the sealing element 11a' formed as a valve seat sealing element and through the through opening 9a of the first connection 9, which serves as an outlet, out of the device.

The fluid respectively flows through between a sealing face formed on the sealing element 11', 11a' and a casing face of the valve element 6. In the flow directions 15-1, 15-2 indicated in FIGS. 2A to 2D, the fluid flows substantially noiseless through the device, while, when the fluid flows in a respective flow direction opposite to the flow direction 15-1, 15-2, noise, in particular flow noise, specifically whistling noise, is created and emitted.

In doing so, the respective length of a gap formed between the sealing face of the sealing element 11', 11a' and the casing face of the valve element 6 as an extension of the free gap in the direction of the longitudinal axis is decisive as an influencing factor for the creation and emission of the noise.

Figure 3A:
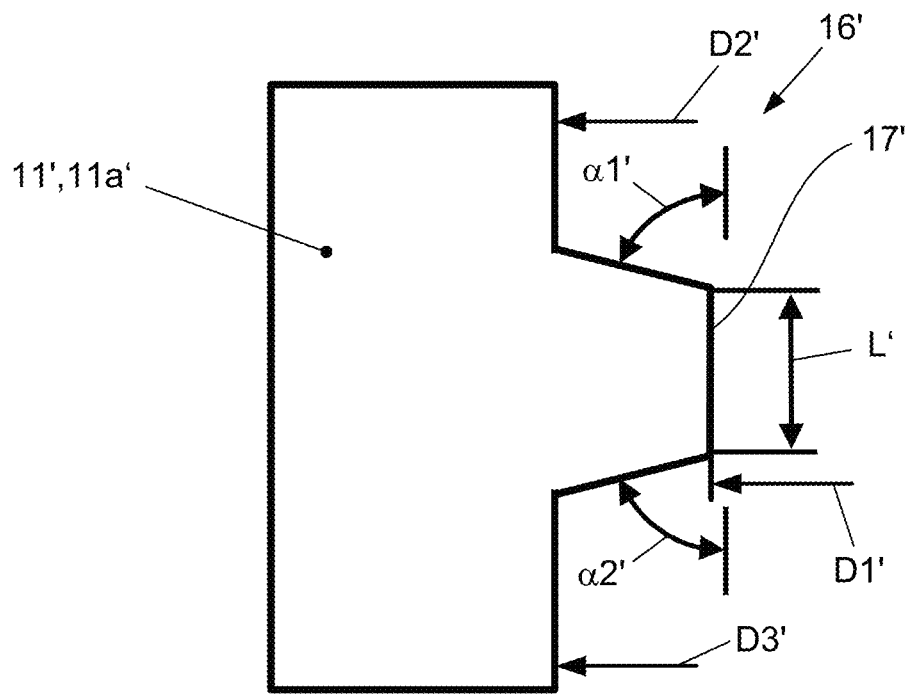
FIGS. 3A to 3C: a respective schematic view of a sealing seat of the devices of FIGS. 2A to 2D of the prior art formed between the valve element and the sealing element.
Figures 3B, 3C:
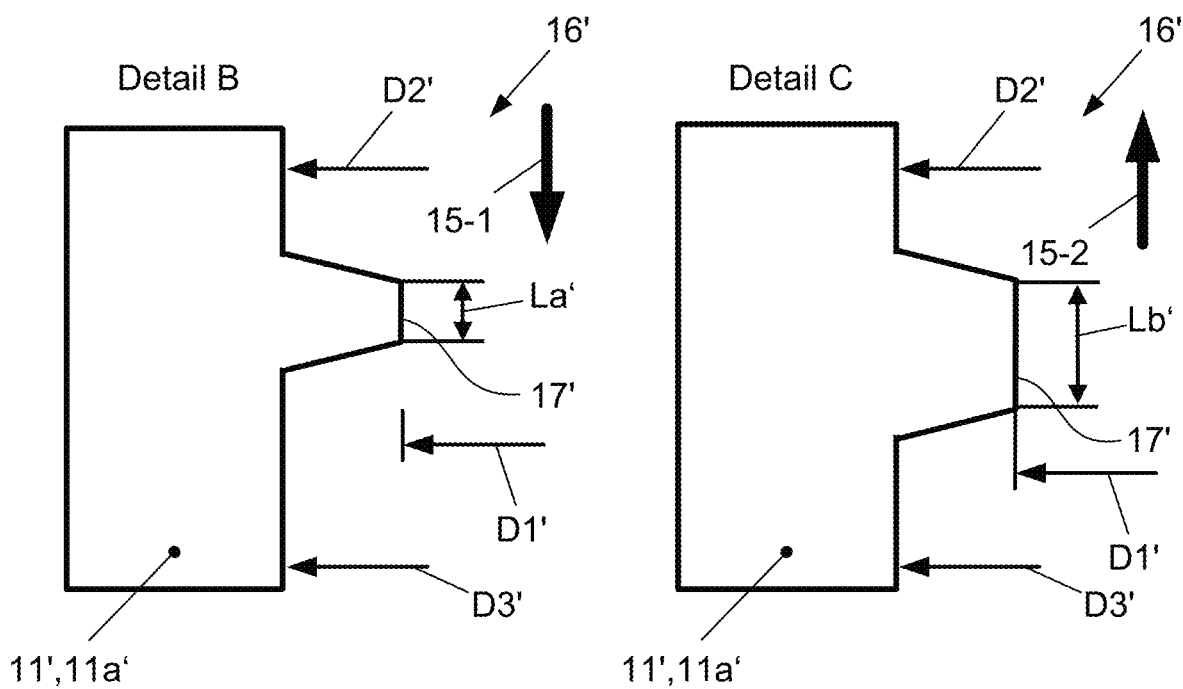

FIGS. 3A to 3C show a respective schematic view of a sealing seat 16' of the devices of FIGS. 2A to 2D formed between the valve element 6 and the sealing element 11', 11a'.

The sealing seat 16' has a sealing seat face 17' oriented in the direction of the longitudinal axis which corresponds to the sealing face of the first sealing element 11' or the sealing element 11a' formed as a valve seat sealing element. The sealing seat face 17' is fully circumferentially arranged about the rotation-symmetric valve element 6, such that a gap, in particular a ring gap, with a fully constant extension in the radial direction and consequently with a constant flow cross-section is formed.

The sealing seat face 17' limiting the ring gap on an outer side has an extension L', La', Lb' in the direction of the longitudinal axis and a sealing seat diameter Dr. The sealing seat face 17' is formed as an annular protrusion of an inner casing face of the sealing element 11', 11a'. In doing so, the inner casing face of the sealing element 11', 11a' has a first sealing element diameter D2' in a first region bordering the protrusion in the direction of the longitudinal axis on the one hand and a second sealing element diameter D3' in a second region bordering the protrusion in the direction of the longitudinal axis on the other hand.

The protrusion is formed in a substantially trapezoidal shape in a cross-section of a plane running in the direction of the longitudinal axis. In doing so, the sealing seat face 17' is arranged as a free side face or end face or surface on one of the two parallel side faces. With the second of the side faces oriented in parallel to one another to the sealing seat face 17', also referred to as a base of the trapeze, the protrusion is connected to the inner casing face of the sealing element 11', 11a'.

The legs connecting the parallel side faces of the trapezoid cross-section of the protrusion are respectively arranged at an opening angle a1', a2' to the longitudinal axis adjacent to the sealing seat face 17'.

FIG. 3B shows a form of the sealing seat face 17' of the sealing seat 16' with an extension La' in the direction of the longitudinal axis from FIG. 2C. When flowing through the device, in particular the ring gap formed between the sealing seat face 17' and the valve element 6, in the flow direction 15-1 according to FIG. 2A or 2C, the fluid substantially flows noiseless. FIG. 3C also shows a form of the sealing seat face 17' of the sealing seat 16' with an extension Lb' in the direction of the longitudinal axis from FIG. 2B or 2D. The fluid substantially flows noiseless through the device, in particular the ring gap formed between the sealing seat face 17' and the valve element 6, in the flow direction 15-2 according to FIG. 2B or 2D.

The extension La', Lb' of the sealing seat face 17' in the direction of the longitudinal axis is critical as an influencing factor for the creation and emission of the noise. The value of the optimal extension La', Lb' for flowing through the device as noiseless as possible is dependent on the flow direction of the fluid 15-1, 15-2. In doing so, the extension La' is smaller than the extension Lb'. However, with the extensions La', Lb', the emission of the noise is only suppressed when flowing through the device in a first flow direction 15-1, 15-2, while, when flowing through in the respective opposite flow direction 15-1, 15-2, noise is emitted.

It is not possible to form the sealing seat face 17' with an extension La', Lb' which suppresses the noise development when flowing through the device in both flow directions 15-1, 15-2.

Figure 4A:
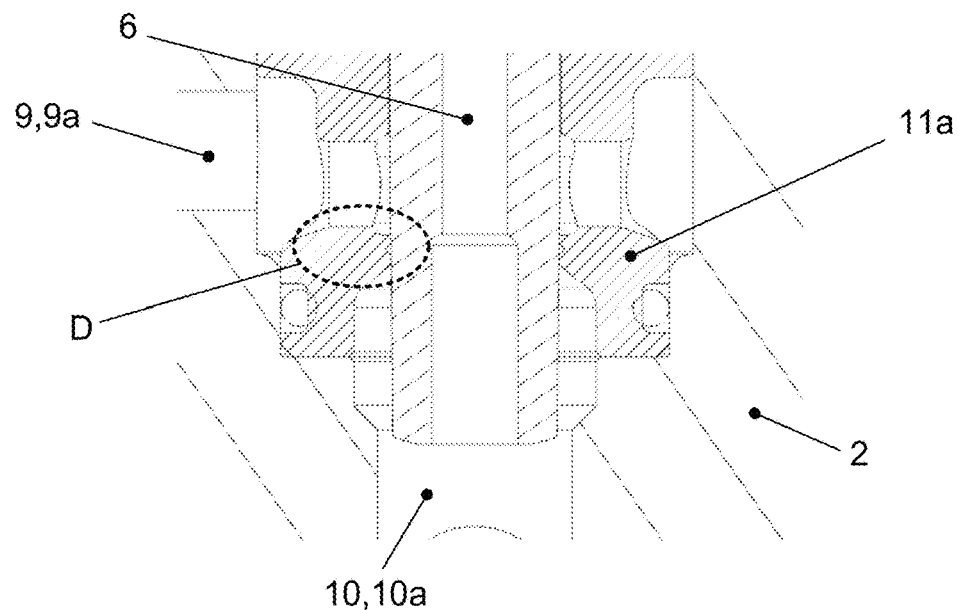
FIGS. 4A and 4B: detailed views of a sealing region respectively formed between the valve element and a sealing element formed as a valve seat sealing element.
Figure 4B:
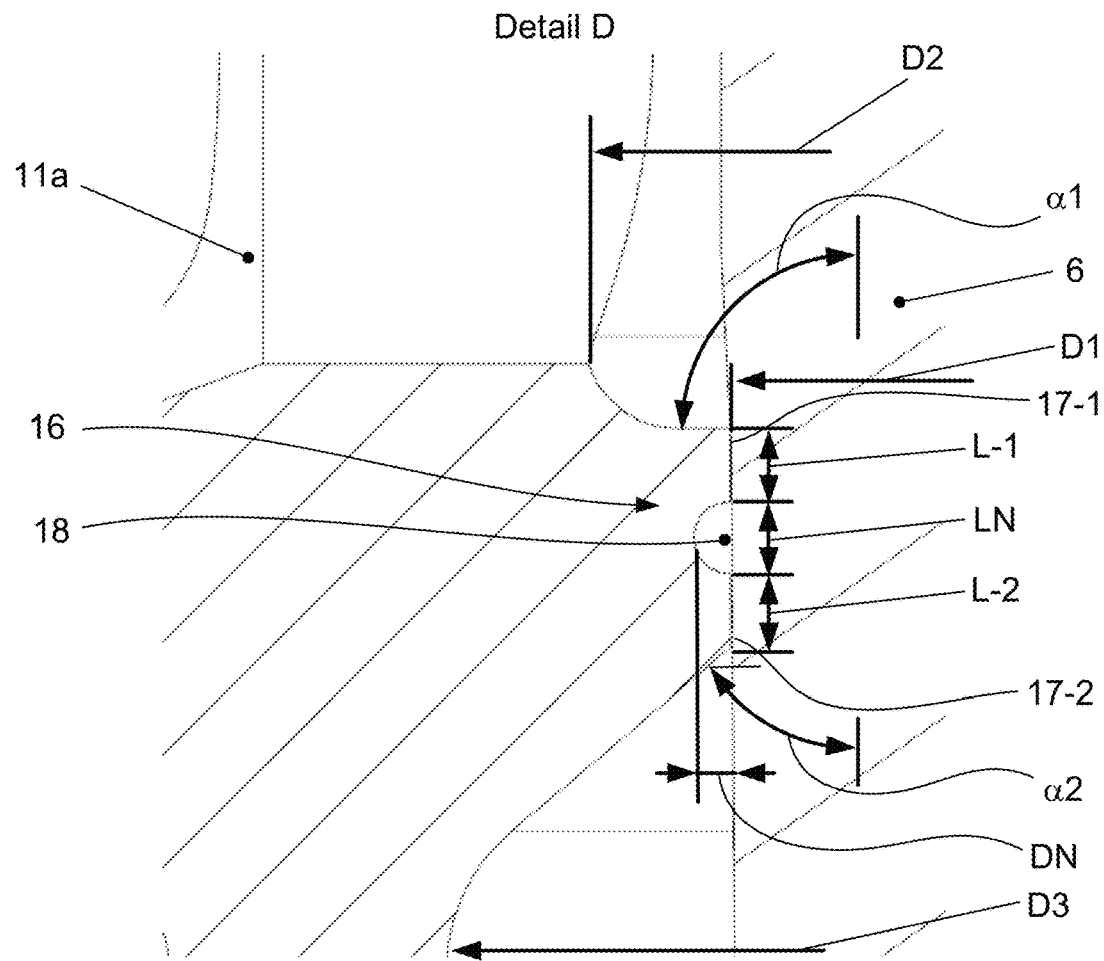

FIGS. 4A and 4B respectively show detailed views of a sealing region 13 formed between the valve element 6 and the sealing element 11a formed as a valve seat sealing element.

The sealing seat 16 has two sealing faces 17-1, 17-2 directed to the interior in the radial direction, which are arranged in parallel and flush to one another. The sealing faces 17-1, 17-2 are spaced apart from one another by a groove 18 formed in the annular protrusion of the inner casing face of the sealing element 11a. The sealing faces 17-1, 17-2 and the groove 18 are formed respectively fully circumferentially in the circumferential direction and thus fully closed.

Consequently, the sealing seat 16 represents a combination of two sealing faces 17-1, 17-2 with different extensions L-1, L-2 in the direction of the longitudinal axis which is formed over the groove 18 with an extension LN in the direction of the longitudinal axis and a certain depth DN in the radial direction.

With this geometry of the sealing seat 16, the development and the emission of the noise are eliminated due to the flowing through the device in both flow directions which are oriented opposite to one another.

With the groove 18 provided within the sealing seat 16 in the direction of the longitudinal axis between the sealing faces 17-1, 17-2, a fully circumferential first ring-shaped gap is formed between the valve element 6 and the sealing element 11a with an extension L-1 in the direction of the longitudinal axis and a fully circumferential second ring-shaped gap in the direction of the longitudinal axis with an extension L-2 is formed. The gaps have, in the direction of the longitudinal axis, different lengths corresponding to the extensions L-1, L-2 of the sealing faces 17-1, 17-2. In doing so, the first gap with the extension L-1 is formed longer than the second gap with the extension L 2.

The local flow characteristics resulting due to the different extensions L-1, L-2 of the sealing faces 17-1, 17-2 and thus the gaps in the direction of the longitudinal axis, in particular a local pre-expansion and a local post-expansion of the gaseous fluid and the thus created turbulences, cause a disturbance of periodically occurring gas vibrations and consequently a changing flow towards the sealing seat 16, which causes the avoidance of the creation and emission of the noise due to the flow through the device 1.

The geometry of the sealing seat 16 can have the following parameters related to the sealing seat diameter D1:
first sealing element diameter D2: (1.05-1.50)-D1,
second sealing element diameter D3: (1.20-4.00)-D1,
extension L-1 of the first sealing face 17-1: (0.2-3.0) mm,
extension L-2 of the second sealing face 17-2:(0.1-10.0) mm,
extension LN of the groove 18: (0.1-10.0) mm,
depth DN of the groove 18: (0.1-4.0) mm,
first opening angle a1: 0-100°, and
second opening angle a2: 30°-90°

In doing so, the sealing seat diameter D1 is in the range from 1 mm to 12 mm, specifically in the range from 5 mm to 9 mm, in particular of 7 mm.

Figure 5:
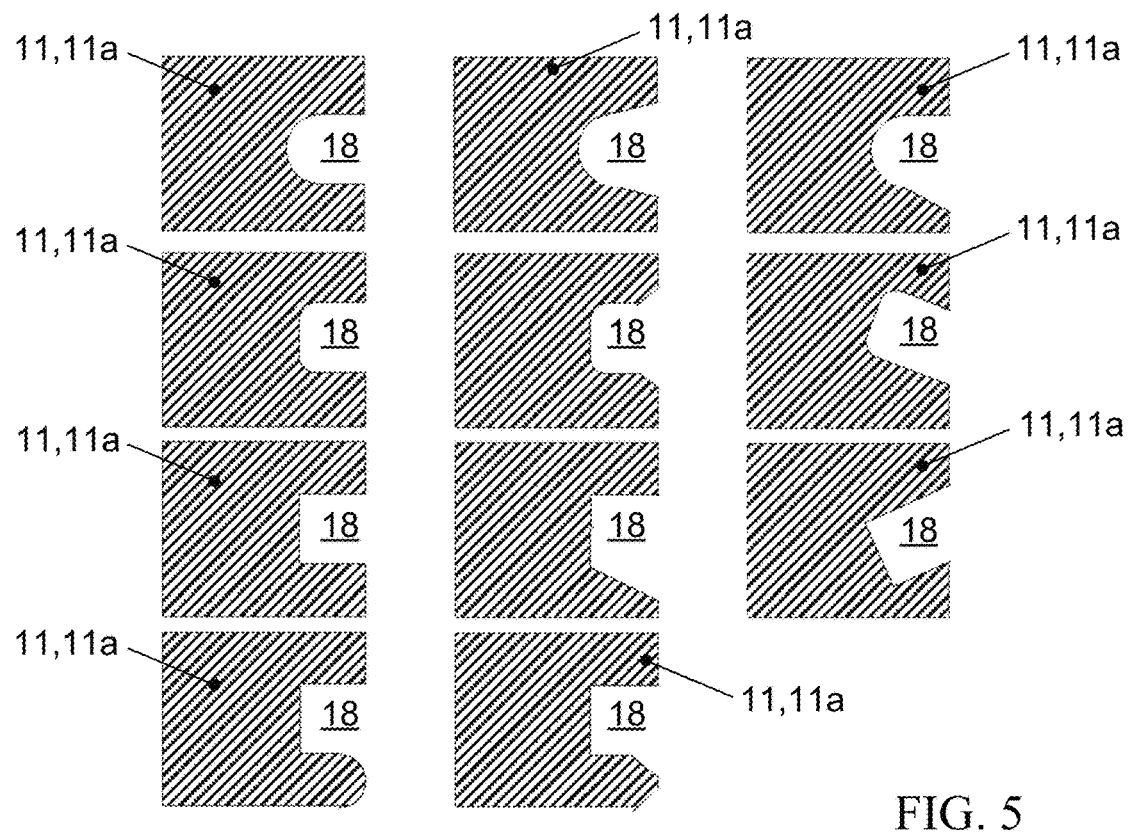
FIG. 5: different shapes and orientations and their combinations of a groove formed in the sealing seat.
Figure 6:
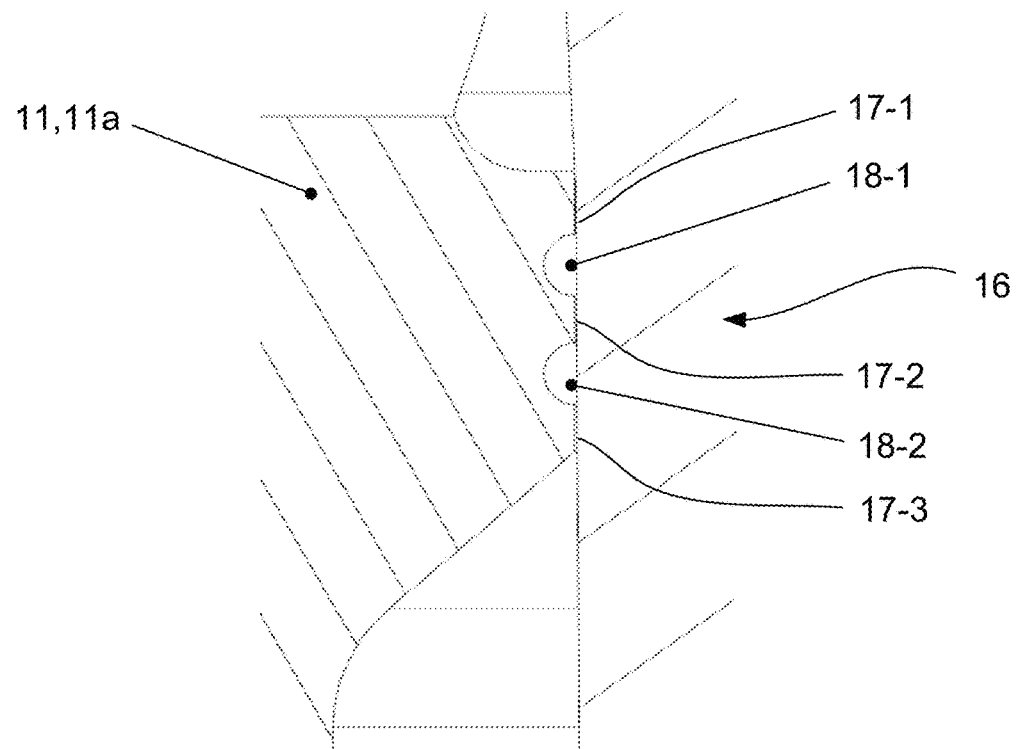
FIG. 6: a detailed view of a further embodiment of a sealing region formed between the valve element and the sealing element with a differing number of grooves within the sealing seat compared to the embodiment according to FIG. 4b.

As seen in FIGS. 5 and 6, which show different shapes and orientations and their combinations of a groove 18, 18-1, 18-2 formed in the sealing seat 16 and a further detailed view of an embodiment of a sealing region 13 formed between the valve element 6 and the sealing element 11, 11a with a different number of grooves 18-1, 18-2 and sealing faces 17-1, 17-2, 17-3 of the sealing seat 16 compared to the embodiment according to FIG. 4B, different embodiments of the sealing seat 16 with the number of grooves 18, 18-1, 18-2, the respective shape and orientation of the groove 18 or the shapes and orientations of the grooves 18-1, 18-2 are conceivable. In doing so, the grooves 18, 18-1, 18-2 can have any shapes and orientations and their combinations. In doing so, the embodiments shown in FIGS. 5 and 6 do not limit the possible total variation width of the embodiments.

LIST OF REFERENCE NUMERALS 1 device, valve
2 housing
2a recess of housing 2
3 electric motor
4 actuating element, drive shaft
4a rotational movement of actuating element 4
5 transmission arrangement
5a section
6 valve element
6a linear movement of valve element 6
6b opening of valve element 6
6c formation of valve element 6
7 valve seat element
8 anti-sliding rotation arrangement
9 first connection
9a through opening of first connection 9
10 second connection
10a through opening of second connection 10
11, 11a, 11', 11a' (first) sealing element
12 second sealing element
13 sealing region
14 regulation region
15-1, 15-2 flow direction
16, 16' sealing seat
17' sealing seat face
17-1 first sealing face
17-2 second sealing face
17-3 third sealing face
18 groove
18-1 first groove
18-2 second groove
D1, D1' sealing seat diameter
D2, D2' first sealing element diameter
D3, D3' second sealing element diameter
L', La', Lb' extension of sealing seat face
L-1 extension of first sealing face 17-1
L-2 extension of second sealing face 17-2
LN extension of groove 18
DN depth of groove 18
p1, p2 pressure
a1, a1' first opening angle
a2, a2' second opening angle
6 angle face of sealing region 13
7 angle face of regulation region 14

The invention claimed is:

1. A device for regulating a through-flow and expanding a fluid in a fluid circuit, the device comprising:
a housing; and
a valve element arranged in an interior of the housing which is movably arranged in a direction of a longitudinal axis relative to the housing, as well as at least one sealing element, wherein the valve element and the at least one sealing element are arranged oriented coaxially to the longitudinal axis, and the valve element is arranged abutting, in a closed condition of the device, the at least one sealing element and, in an opened condition of the device, forming at least one fully circumferential gap between the valve element and the at least one sealing element, wherein the at least one sealing element forms a sealing seat in connection with the valve element, and the at least one sealing element or the valve element has at least two sealing faces in a region of the sealing seat which are arranged spaced apart from one another in the direction of the longitudinal axis, wherein a respective groove is formed between the at least two sealing faces which are arranged adjacent to one another, and wherein a length of a first one of the at least two sealing faces is different from a length of a second one of the at least two sealing faces.

2. The device according to claim 1, wherein the valve element is formed about the longitudinal axis in a rotation-symmetric manner.

3. The device according to claim 1, wherein the at least one sealing element has a form of a circular ring with a circular opening for receiving the valve element.

4. The device according to claim 3, wherein the at least two sealing faces and the respective groove which is formed between respective ones of the at least two sealing faces which are arranged adjacent to one another are formed on an inner casing face of the at least one sealing element in a fully circumferential manner.

5. The device according to claim 3, wherein the at least one sealing element is formed with an annular protrusion on an inner casing face which protrudes from the inner casing face.

6. The device according to claim 5, wherein the annular protrusion protruding from the inner casing face of the at least one sealing element has an end face directed to an interior in a radial direction with a sealing seat diameter D1.

7. The device according to claim 6, wherein the at least two sealing faces and the respective groove which is formed between respective ones of the at least two sealing faces which are arranged adjacent to one another are formed on the end face directed to the interior in the radial direction of the annular protrusion protruding from the inner casing face of the at least one sealing element.

8. The device according to claim 6, wherein the sealing seat diameter D1 has a value in a range from 1 mm to 12 mm.

9. The device according to claim 8, wherein the inner casing face of the at least one sealing element has a first sealing element diameter D2 in a first region bordering the protrusion protruding from the inner casing face in the direction of the longitudinal axis and a second sealing element diameter D3 in a second region bordering the protrusion protruding from the inner casing face in the direction of the longitudinal axis.

10. The device according to claim 9, wherein the first sealing element diameter D2 has a value in a range from 1.05×D1 to 1.50×D1.

11. The device according to claim 9, wherein the second sealing element diameter D3 has a value in a range from 1.20×D1 to 4.00×D1.

12. The device according to claim 6, wherein legs connecting the end face of the protrusion protruding from the inner casing face of the at least one sealing element to the inner casing face are oriented in a first opening angle a1 and a second opening angle a2 to the longitudinal axis.

13. The device according to claim 12, wherein the first opening angle a1 has a value in the range from 0° to 100°.

14. The device according to claim 13, wherein the second opening angle a2 has a value in the range from 30° to 90°.

15. The device according to claim 1, wherein the at least two sealing faces are arranged oriented parallel and flush to one another.

16. The device according to claim 1, wherein the at least two sealing faces are formed with different extensions L-1, L-2 in the direction of the longitudinal axis and the respective groove which is formed between respective ones of the at least two sealing faces which are arranged adjacent to one another is formed with an extension LN in the direction of the longitudinal axis and a depth DN in a radial direction.

17. The device according to claim 16, wherein a first one of the at least two sealing faces has an extension L-1 in the direction of the longitudinal axis in a range from 0.2 mm to 3.0 mm.

18. The device according to claim 17, wherein a second one of the at least two sealing faces has an extension L-2 in the direction of the longitudinal axis in a range from 0.1 mm to 10.0 mm.

19. The device according to one of claims 16, wherein the respective groove which is formed between respective ones of the at least two sealing faces which are arranged adjacent to one another has the extension LN in the direction of the longitudinal axis in the range from 0.1 mm to 10.0 mm.

20. The device according to claim 16, wherein the respective groove which is formed between respective ones of the at least two sealing faces which are arranged adjacent to one another has the depth DN in the radial direction in a range from 0.1 mm to 4.0 mm.

21. The device according to claim 1, wherein, in the opened condition of the device, the at least one fully circumferential gap includes at least one fully circumferential first ring-shaped gap with an extension L-1 of a wherein the first one of the at least two sealing faces in the direction of the longitudinal axis and a fully circumferential second ring-shaped gap with an extension L-2 of a second one of the at least two sealing faces in the direction of the longitudinal axis are formed between the valve element and the at least one sealing element in the region of the sealing seat.

22. The device according to claim 1, wherein the valve element is arranged within a valve seat element or within a valve seat sealing element.

23. The device according to claim 1, wherein the valve element is arranged within a valve seat element and the at least one sealing element is formed as a valve seat seal, sealing the valve element against the housing and against the valve seat element.

24. The device according to claim 23, wherein the valve element is arranged in a sealing manner against the housing and against the valve seat element via two sealing elements.

25. The device according to claim 24, wherein a first one of the two sealing elements is formed as a valve seat seal, sealing the valve element against the housing and against the valve seat element, and a second one of the two sealing elements is formed as a sliding seal, sealing the valve element against the housing.

26. The device according to claim 22, wherein the at least one sealing element is formed as a valve seat sealing element, sealing the valve element against the housing.

27. The device according to claim 26, wherein the valve element is arranged in a sealing manner against the housing via two sealing elements.

28. The device according to claim 27, wherein a first one of the two sealing elements is formed as the valve seat sealing element and a second one of the two sealing elements is formed as a sliding seal, sealing the valve element against the housing.

29. The device according to claim 1, wherein an actuating element and a transmission arrangement for transmitting a rotational movement of the actuating element about the longitudinal axis into a linear movement of the valve element are formed in the direction of the longitudinal axis relative to the housing.

30. The device according to claim 29, wherein the actuating element is formed as a drive shaft.

31. The device according to claim 30, wherein the drive shaft is connected to an electric motor.

* * * * *